(12) United States Patent
Grubel

(10) Patent No.: US 9,702,737 B2
(45) Date of Patent: Jul. 11, 2017

(54) SONAR SYSTEM AND METHOD USING ARRAYS OF OPTICAL RING RESONATOR SENSORS

(71) Applicant: The Boeing Company, Chicago, IL (US)

(72) Inventor: Brian C. Grubel, Glen Burnie, MD (US)

(73) Assignee: The Boeing Company, Chicago, IL (US)

( * ) Notice: Subject to any disclaimer, the term of this patent is extended or adjusted under 35 U.S.C. 154(b) by 20 days.

(21) Appl. No.: 14/663,230

(22) Filed: Mar. 19, 2015

(65) Prior Publication Data

US 2016/0273943 A1   Sep. 22, 2016

(51) Int. Cl.
| | |
|---|---|
| *G01B 9/02* | (2006.01) |
| *G01D 5/353* | (2006.01) |
| *G02B 6/12* | (2006.01) |
| *G01S 3/80* | (2006.01) |
| *G01S 3/801* | (2006.01) |
| *G01H 9/00* | (2006.01) |

(52) U.S. Cl.
CPC ........... *G01D 5/35322* (2013.01); *G01H 9/00* (2013.01); *G01S 3/80* (2013.01); *G01S 3/801* (2013.01); *G02B 6/12004* (2013.01); *G02B 2006/12061* (2013.01); *G02B 2006/12138* (2013.01)

(58) Field of Classification Search
CPC .... G01S 7/521; G01D 5/35322; G01D 5/268; G02B 6/12004; G02B 2006/12061; G02B 2006/12138; G01B 9/02023
USPC ........................................................ 356/480
See application file for complete search history.

(56) References Cited

U.S. PATENT DOCUMENTS

| | | |
|---|---|---|
| 4,300,813 A | 11/1981 | Gravel |
| 4,421,384 A | 12/1983 | McMahon |

(Continued)

OTHER PUBLICATIONS

Dong, B., Cai, H., Tsai, J.M., kROPELNICKI, P., Randles, A.B., Tang, M., Kwong, D.L., Liu, A.Q., Nano-Opto-Mechanical (NOM) Acoustic Wavefront Sensor via Ring Resonators, Transducers 2013, Barcelona, Spain, Jun. 16-20, 2013.

(Continued)

*Primary Examiner* — Tarifur Chowdhury
*Assistant Examiner* — Jonathon Cook
(74) *Attorney, Agent, or Firm* — Economou Silfin LLP; John S. Economou

(57) ABSTRACT

An optical ring resonator sensor array module for a passive SONAR system. The module includes a supporting structure; a silicon substrate mounted on the supporting structure, and a top plate mounted over the silicon structure. The silicon substrate includes an optical waveguide having an input and an output and a plurality of optical ring resonators distributed across the silicon substrate to form a two-dimensional pattern. Each optical ring resonator is positioned adjacent to the optical waveguide and each has a different predetermined diameter. The top plate includes a plurality of diaphragms, one for each of the plurality of optical ring resonators. The diaphragms are distributed on the top plate such that each of the plurality of diaphragms is positioned over an associated one of the plurality of optical ring resonators. In addition, each of the diaphragms is configured to flex in response to externally applied acoustical pressure.

20 Claims, 13 Drawing Sheets

(56) References Cited

U.S. PATENT DOCUMENTS

| | | | |
|---|---|---|---|
| 5,552,791 | A | 9/1996 | Metal |
| 7,587,105 | B2 | 9/2009 | Ashkenazi et al. |
| 2005/0063444 | A1* | 3/2005 | Frick .................. G01D 5/35312 372/92 |
| 2012/0227504 | A1 | 9/2012 | Goldner et al. |
| 2012/0308181 | A1* | 12/2012 | Hafezi ............... G02B 6/12007 385/31 |
| 2014/0133280 | A1 | 5/2014 | Daryoush et al. |

OTHER PUBLICATIONS

Zhao, X., Tsai, J.M., Cai, H., Ji, X.M., Zhou, J., Bao, M.H., Huang, Y.P., Kwong, D.L, Liu, A.Q., A Nano-Optical-Mechanical Pressure Sensor Via Ring Resonator, Optics Express, vol. 20, No. 8, Apr. 9, 2012.

Morris, P., Hurrell, A., Zhang, E., Beard, P., A Febry-Perot Fiber-Optic Ultrasonic Hydrophone for the Simultaneous Measurement of Temperature and Acoustic Pressure, J. Acoust. Soc. Am., vol. 125, No. 6, Jun. 2009, pp. 3611-3622.

Gopinath, R., Srinivasan, K., Umchid, S., Bansal, L., Daryoush, A.S., Lewin, P.A., El-Sherif, M., Improved Fiber Optic Hydrophone Sensors, 2007 IEEE Ultrasonics Symposium, pp. 2319-2322.

Northrup Grumman Fiber-Optic Acoustic Sensors (FOAS) Brochure, retrieved from http://www.northropgrumman.com/ on Mar. 5, 2015.

Precision Acoustics:Fibre-Optic Hydrophone System: User Guide, retrieved from http://acoustics.co.uk/ on Mar. 5, 2015.

\* cited by examiner

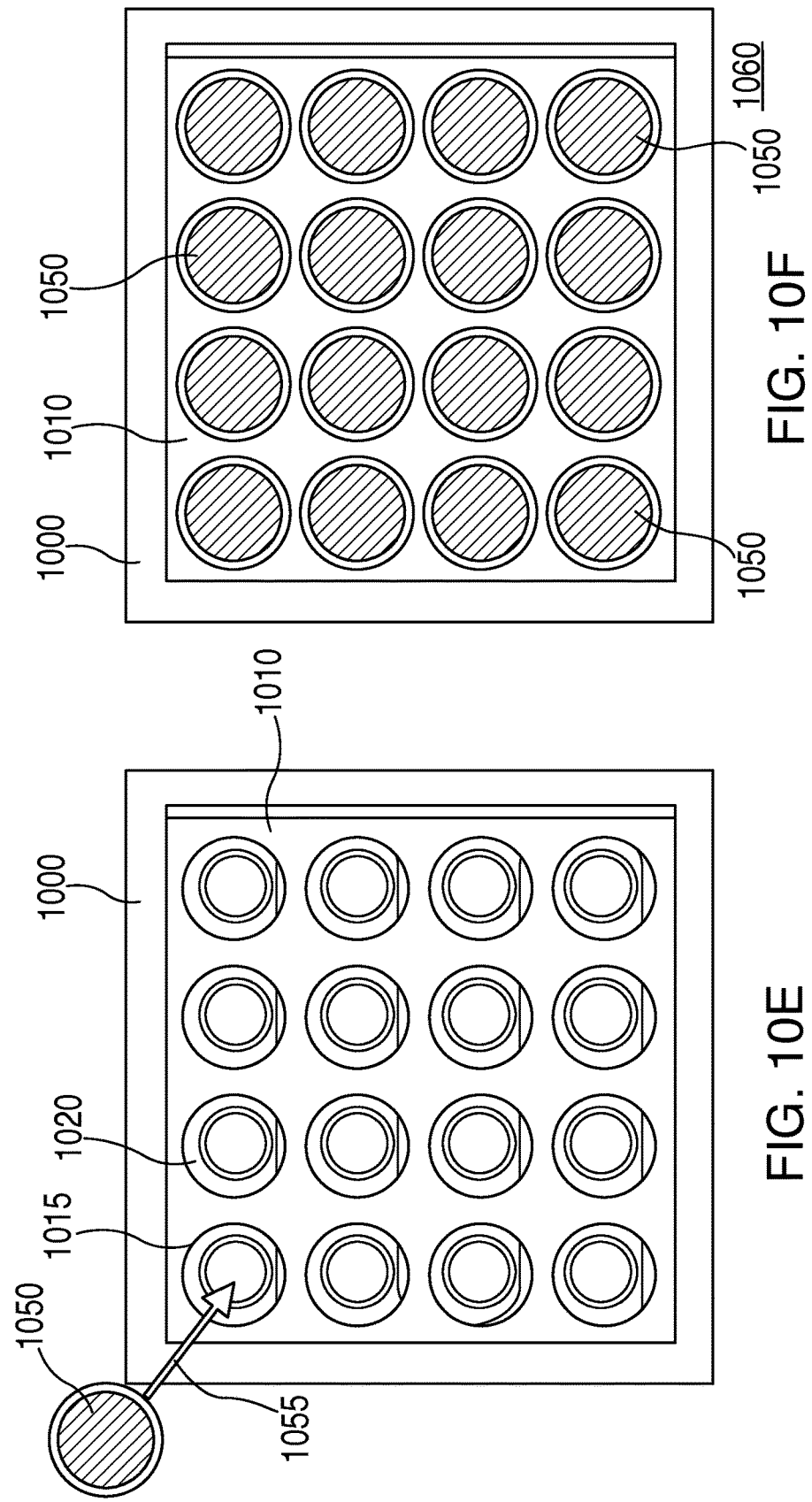

SONAR SYSTEM AND METHOD USING ARRAYS OF OPTICAL RING RESONATOR SENSORS

FIELD

This disclosure relates generally to sonar system and method that uses arrays of optical ring resonator sensors.

BACKGROUND

SONAR is an acronym that stands for "Sound Navigation and Ranging" and is a technique that uses sound propagation under water to navigate or detect objects in or on the water. Sonar may be active, in which case a pulse of sound is emitted and then reflections of the pulse from objects are received, or sonar may be passive, in which case objects are detected by listening for sound emanating from such object. Thus, active sonar requires a transmitter and a receiver, while passive sonar requires only a receiver. While logically they are different devices with different functions, physically they can be the same device.

Passive sonar receivers may utilize arrays of sensors formed from piezoelectric crystals or ferroelectric ceramics. Each of the sensors in each array transforms the received acoustic signal into an electrical signal by converting pressure variations into a corresponding voltage variation. This type of receiver typically requires long copper wires or cables for each sensor in each array, adding significant weight and cost. Further, electromagnetic interference problems may arise without the use of the more expensive and heavier coaxial cable.

Passive sonar receivers may also rely on fiber optic-based sensors arranged in arrays. However, conventional fiber optic-based sensors require at least one fiber per sensor and require that each separate sensor be individually formed.

Accordingly, there is a need for a passive sonar receiver which overcomes the drawbacks recited above.

SUMMARY

In a first aspect, an optical ring resonator sensor array module for a passive SONAR system includes a supporting structure and a silicon substrate mounted on the supporting structure. The silicon substrate includes an optical waveguide and a plurality of optical ring resonators. The plurality of optical ring resonators are distributed across the silicon substrate to form a two-dimensional pattern. Each of the plurality of optical ring resonators is positioned adjacent to the optical waveguide. Each of the plurality of optical ring resonators has a different predetermined diameter. The optical waveguide has an input for receiving light at a first end thereof and an output for emitting light at a second end thereof. The module also includes a top plate mounted over the silicon substrate. The top plate has a plurality of diaphragms, one diaphragm for each of the plurality of optical ring resonators. The diaphragms are distributed on the top plate such that each of the plurality of diaphragms is positioned over an associated one of the plurality of optical ring resonators. Each of the diaphragms are configured to flex in response to externally applied acoustical pressure.

In a further embodiment, the supporting structure may include a mechanical stop for each of plurality of optical ring resonators, the mechanical stop configured to prevent overstress of the silicon substrate in response to the externally applied acoustical pressure. Also, in one alternative embodiment, each of the plurality of diaphragms may be mounted in an associated aperture of the top plate and may be secured in the associated aperture of the top plate by an o-ring seal. In another alternative embodiment, each of the plurality of diaphragms may be mounted in an integral part of the top plate.

Still further, each of the plurality of diaphragms may have the same diameter, the same thickness, and the same flexibility. Each of the associated ones of the plurality of optical ring resonators and of the plurality of diaphragms may form a separate sensor having an associated sensitivity. In one alternative embodiment, each of the plurality of diaphragms may have the same diameter and the same flexibility, and the thickness of each of the diaphragms may be varied to equalize the sensitivity of each of the separate sensors. In another alternative embodiment, each of the plurality of diaphragms may have the same flexibility and the same thickness, and the diameter of each of the diaphragms may be varied to equalize the sensitivity of each of the separate sensors. In still another alternative embodiment, each of the plurality of diaphragms may have the same diameter and the same thickness, and the flexibility of each of the diaphragms may be varied to equalize the sensitivity of each of the separate sensors.

In a second aspect, a passive SONAR system is provided. The system includes an optical source for providing a light beam. The system also includes a first fiber optic cable having a first end and a second end. The first end of the first optical cable is coupled to receive the light beam from the optical source. The system also includes an optical ring resonator sensor array module comprising a supporting structure and a silicon substrate mounted on the supporting structure. The silicon substrate includes an optical waveguide and a plurality of optical ring resonators. The plurality of optical ring resonators are distributed across the silicon substrate to form a two-dimensional pattern. Each of the plurality of optical ring resonators is positioned adjacent to the optical waveguide. Each of the plurality of optical ring resonators have a different predetermined diameter. The optical waveguide has an input coupled to the second end of the first optic cable and an output for emitting light at a second end thereof. The module also includes a top plate mounted over the silicon substrate. The top plate has a plurality of diaphragms, one diaphragm for each of the plurality of optical ring resonators. The diaphragms are distributed on the top plate such that each of the plurality of diaphragms is positioned over an associated one of the plurality of optical ring resonators. Each of the diaphragms is configured to flex in response to externally applied acoustical pressure. Each of the associated ones of the plurality of optical ring resonators and of the plurality of diaphragms form a separate acoustical pressure sensor. The system also includes a second fiber optic cable having a first end and a second end. The first end of the second optical cable is coupled to the output of the optical waveguide on the silicon substrate. The system also includes an optical detector coupled to the second end of the second fiber optic cable. The optical detector is configured to convert any received light signal from the second fiber optic cable to an associated electrical signal. Finally, the system includes a processor coupled to receive the electrical signal from the optical detector. The processor is configured to process the received electrical signal to calculate a measurement signal for each of the separate acoustical pressure sensors based on a change in a center frequency of a notch filter formed by the optical ring resonator associated with each separate acoustical pressure sensor.

In a third aspect, a method for providing a passive SONAR system. A light signal is provided to an input of an optical ring resonator sensor array module. The module includes a silicon substrate mounted on a supporting structure. The silicon substrate includes an optical waveguide and a plurality of optical ring resonators. The plurality of optical ring resonators are distributed across the silicon substrate to form a two-dimensional pattern. Each of the plurality of optical ring resonators is positioned adjacent to the optical waveguide. Each of the plurality of optical ring resonators has a different predetermined diameter. The optical waveguide has an input coupled to the input of the module and an output for emitting light at a second end thereof coupled to an output of the module. The module also includes a top plate mounted over the silicon substrate. The top plate has a plurality of diaphragms, one diaphragm for each of the plurality of optical ring resonators. The diaphragms are distributed on the top plate such that each of the plurality of diaphragms is positioned over an associated one of the plurality of optical ring resonators. Each of the diaphragms is configured to flex in response to externally applied acoustical pressure. Each of the associated ones of the plurality of optical ring resonators and of the plurality of diaphragms form a separate acoustical pressure sensor. The light signal received from the output of the module is converted to an associated electrical signal. Finally, the associated electrical signal is processed to calculate a measurement signal for each of the separate acoustical pressure sensors based on a change in a center frequency of a notch filter formed by the optical ring resonator associated with each separate acoustical pressure sensor. In a further embodiment, the measurement signals for the separate acoustical pressure sensors are equalized based on predetermined information.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which:

FIGS. 10A, 10B, 10C, 10D, 10E and 10F are block diagrams showing the assembly steps of an embodiment of the sensor array of the present disclosure;

DETAILED DESCRIPTION

In the present disclosure, like reference numbers refer to like elements throughout the drawings, which illustrate various exemplary embodiments of the present disclosure.

The present disclosure is directed to a sensor array formed from one or more two-dimensional (or greater) optical ring resonator sensor arrays, each sensor formed from an optical ring resonator installed adjacent to an associated flexible diaphragm, for use in a passive acoustic sonar. The resonance conditions of the ring resonators essentially creates a series of notch filters for light traveling through an adjacent waveguide. As sound waves move against an associated diaphragm, the diaphragm deflects and causes a change in the radius of the ring resonator and thereby shifting a resonance condition of the ring resonator and changing the characteristics (in particular the center wavelength) of the notch filter. In this way, the change in the center wavelength of each notch filter can be directly correlated to the intensity of the sound wave. By including a number of such devices in two-dimensional array, the resulting array can be used for acoustic imaging and ranging, particularly in passive sonar applications.

Figure 1:
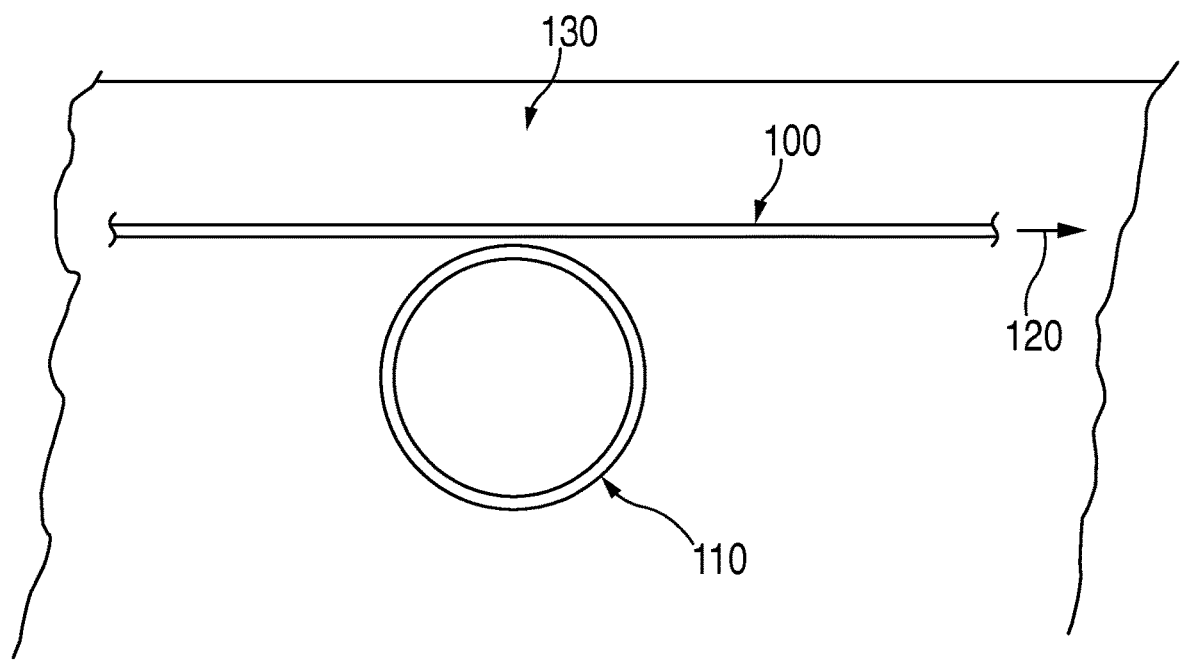
FIG. 1 is a top view of a single optical ring resonator used in the sensor array of the present disclosure.

FIG. 1 shows a single optical ring resonator consisting of a silicon bus optical waveguide 100 that is positioned close to a closed-loop optical ring 110, with both the waveguide 100 and the closed-loop optical ring 110 formed on a silicon substrate 130. The closed-loop optical ring 110 acts as a tuned notch filter for light 120 passing through waveguide 100.

Figure 2:
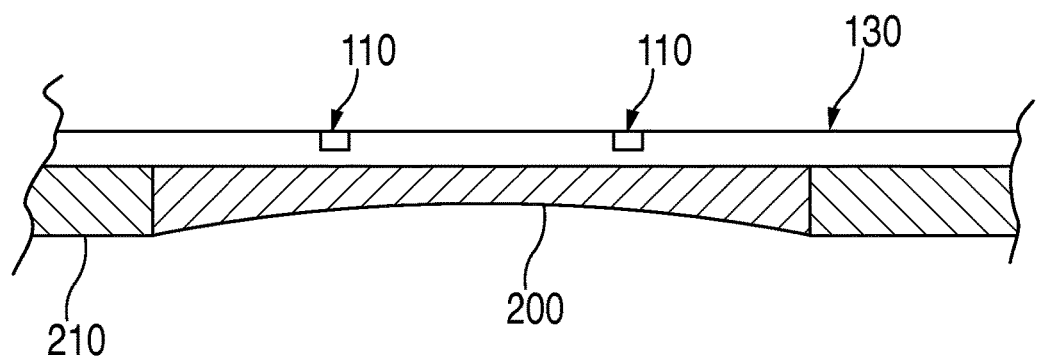
FIG. 2 is a cross-sectional view of a single optical ring resonator used in the sensor array of the present disclosure.

FIG. 2 shows a cut-away view of a single optical ring resonator sensor with the silicon substrate 130 positioned against a flexible diaphragm 200 and the associated mounting bracket 210. As sound waves are applied to the diaphragm 200, the diaphragm deforms and pressure is applied to silicon substrate 130 in the area of closed-loop optical ring 110, causing the optical ring 110 to deform slightly and thus change the radius of such ring 110, thereby altering the resonance thereof.

Figure 3:
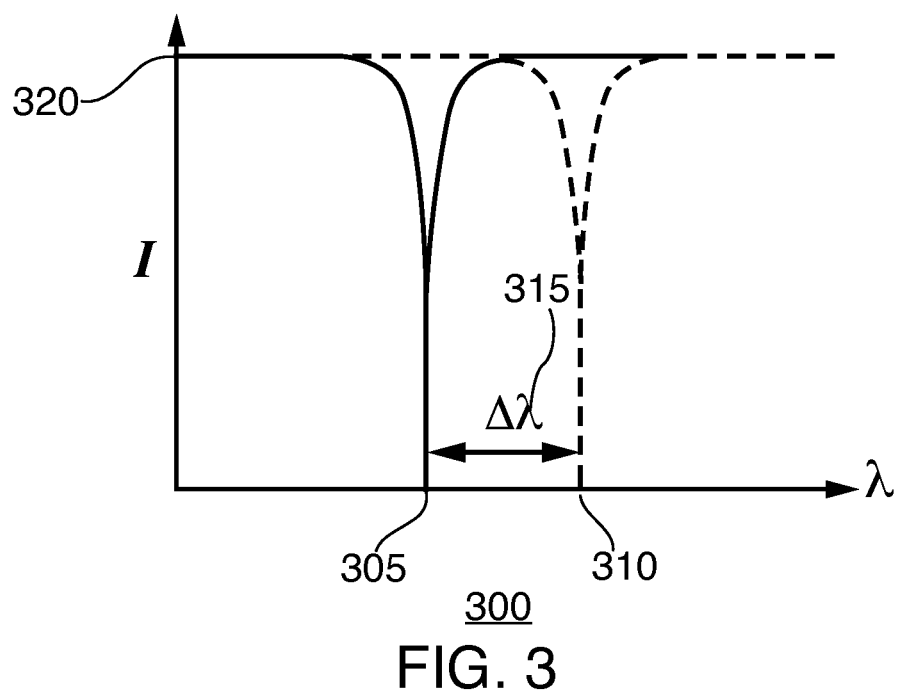
FIG. 3 is graph showing the output of a single optical ring resonator used in the sensor array of the present disclosure.

FIG. 3 is a graph 300 of the magnitude 320 of the light passing through the waveguide 130 showing how the notch frequency shifts from first resonant frequency $\lambda_1$ 300 (i.e., with no acoustical pressure applied) to a second resonant frequency $\lambda_2$ 310 (with acoustical pressure applied). With proper selection of the size of the optical ring 110 and the stiffness of the diaphragm 200, the variation in frequency shift versus acoustical pressure applied is linear, and thus the frequency shift can be used to identify the acoustical pressure applied.

Figure 4:
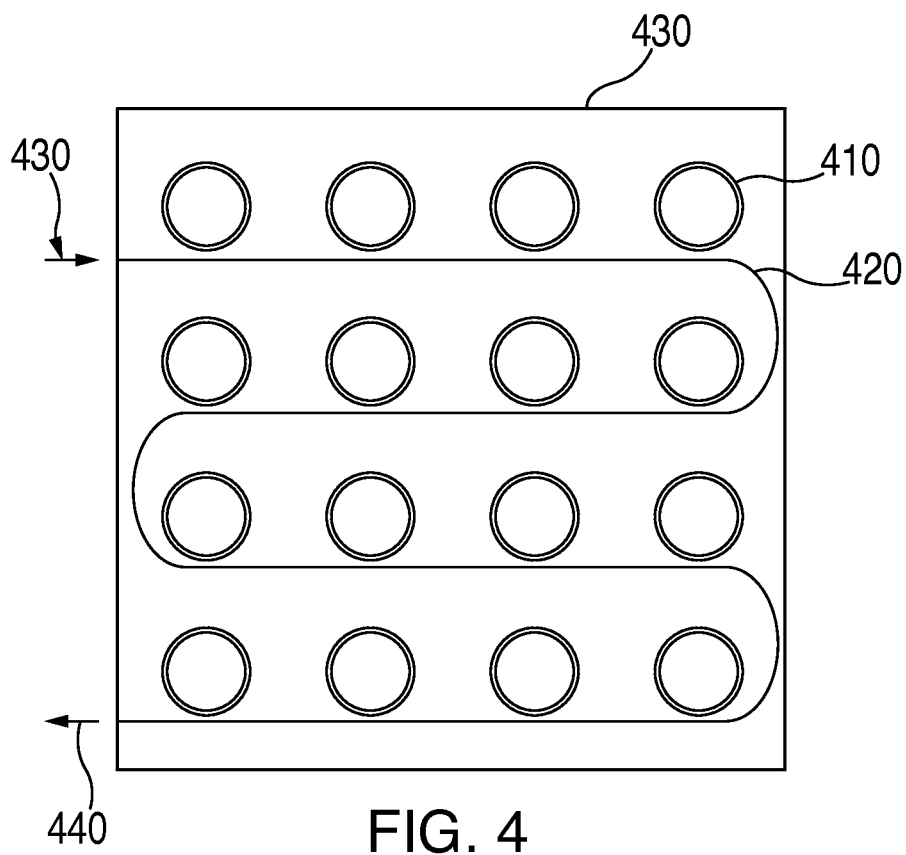
FIG. 4 is a top view of a silicon substrate etched to include a two-dimensional array of optical ring resonators for the sensor array of the present disclosure.

FIG. 4 shows a silicon substrate 410 including a two dimensional array of optical rings 410 formed in substrate 430 and configured in a 4×4 array, with an optical waveguide 420 also formed in substrate 430 such that the light 440 passing into waveguide 420 will pass by each of the optical rings 410. By altering the diameter of each optical ring 410 slightly, the resonant frequency of each ring 410 will be slight different, as will be the related notch frequency created by each optical ring 410. In this way, when silicon substrate 410 is mounted in a sensor array with associated diaphragms for each optical ring 410, the output light 450 can be analyzed (as discussed below with respect to FIG. 12) to determine the acoustical pressure being sensed at each of the diaphragms (by determining the frequency shift in the notch frequency for each resonant ring).

Figure 12:
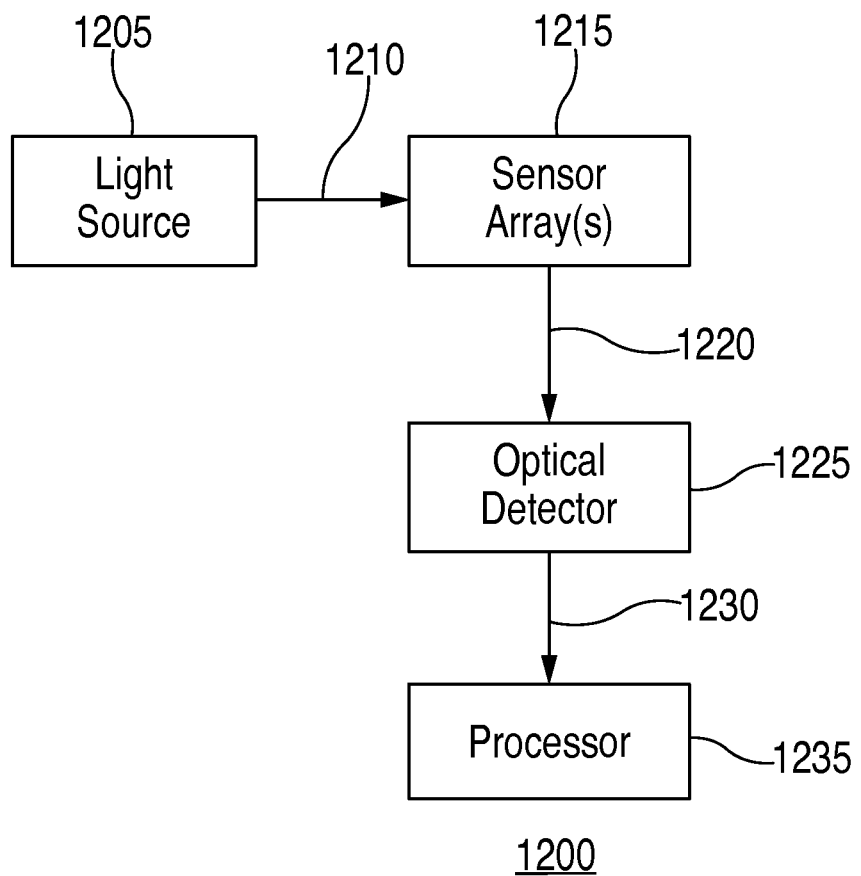
FIG. 12 is a block diagram of a complete passive sonar system using the sensor array of the present disclosure.

The optical ring resonator sensor array disclosed herein provides significant advantages over standard piezoelectric transducer arrays and other types of optically-based acoustic sensors. By eliminating any need for copper wiring, the optical ring resonator sensor array disclosed herein significantly reduces or even eliminates any issues related to electromagnetic interference (EMI). Conventional piezoelectric transducer modules require two electrically conducting cables per module which may include shielding and/or consist of twisted pair wiring (and thus further increase the weight of the cabling). Other types of optical detectors require either one or two fibers per sensor module. In the present disclosure, however, a single-mode fiber optic (SMFO) input cable coupled to a broadband spectrum light source and an associated single-mode fiber optic (SMFO) output cable (as shown in FIG. 12) can serve multiple modules (each consisting of a two-dimensional array of sensors). In addition, conventional acoustic sensor arrays are only one or two-dimensional, but the optical ring resonator sensor array of this disclosure is smaller than conventional sensor arrays and thus may easily be formed into various three-dimensional shapes, for example, formed into a spherical configuration.

Each individual sensor in an array must have slightly different resonant characteristics to allow all of the sensors in that array to share a common optical waveguide (since the signal for each sensor corresponds to the shift in center frequency of the notch filter created by the optical ring resonator, each sensor must have a different center frequency). The resonant frequency of each optical ring resonator is controlled by the diameter of the ring and thus each optical ring resonator in the sensor array must have a slightly different diameter ring. However, the sensitivity of each optical ring resonator sensor is highly dependent on the diameter of the ring relative to the diameter of the associated diaphragm. Thus, if all of optical ring resonator sensors in a single array have the same size diaphragm (but different size rings), each separate sensor will have a different sensitivity to applied acoustical pressure. Thus, in a preferred embodiment of the disclosed system, the diameter of each diaphragm is adjusted slightly to account for the variation in size of the associated ring for the optical ring resonator sensor, thereby normalizing the sensitivity of each separate sensor (i.e., optical ring resonator and diaphragm combination). As one of ordinary skill in the art will readily recognize, there are other ways to normalize the sensitivity of each separate sensor, e.g., in software post-processing.

In order to increase the sensitivity of a particular sensor, the diaphragm/ring combination may be increased in diameter to create a higher deflection in the diaphragm for a particular diaphragm thickness. As one of ordinary skill in the art will readily recognize, however, there are minimum and maximum thicknesses of the material forming each diaphragm. The minimum thickness is set for the minimum desired level of protection (e.g., from damage caused by harsh external environmental conditions) and based on manufacturability constraints. The maximum thickness is controlled by the maximum amount of strain of the silicon substrate material (and/or the yield strength of such material). This maximum strain amount limits the maximum deflection of the diaphragm for designed acoustical pressures (and thus the corresponding maximum size/thickness ratio for each diaphragm).

Other constraints on the design of the optical ring resonator sensor array include the total bandwidth of the source and receiver (shown in FIG. 12), the total optical path length, connection losses, transmitter power, and receiver sensitivity. As one of ordinary skill in the art will readily recognize, there is a tradeoff between the sensitivity of each sensor and the maximum number of sensors (and sensory arrays) for a particular optical pathway. The sensitivity of each sensor may be increased for low level signal detection by: (1) reducing the thickness of the diaphragm; (2) increasing the area (and thus also the diameter) of the diaphragm; and (3) making the diaphragm from a more flexible material. The optimal diameter for each optical ring resonator may optimized based on the design of the diaphragm and should be smaller than the maximum flexible dimension of the associated diaphragm in order to maximize sensitivity.

Figure 5:
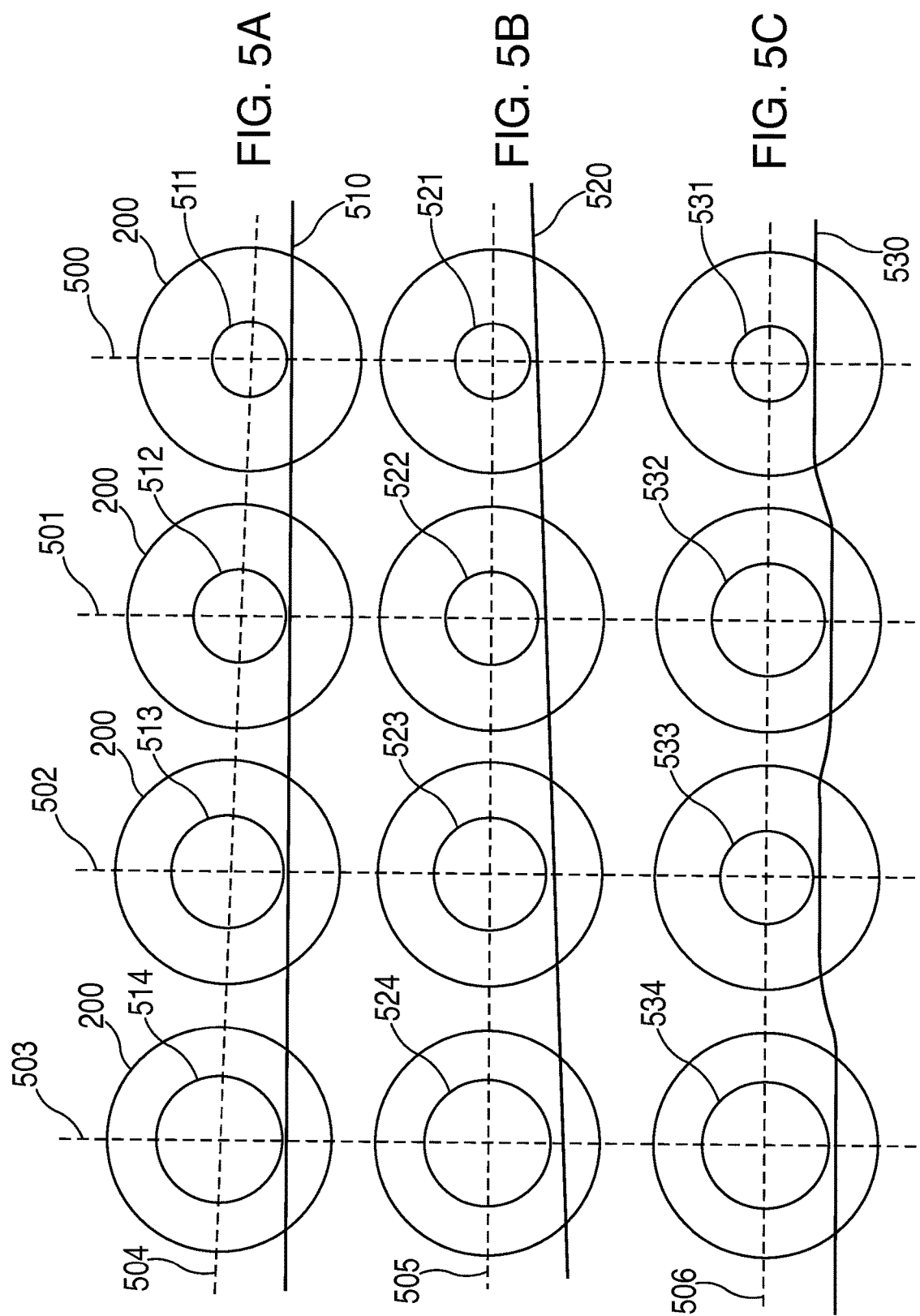
FIGS. 5A, 5B and 5C are block diagrams showing different configurations for positioning the optical waveguide adjacent to the ring resonators according to different aspects of the present disclosure.

Referring now to FIGS. 5A, 5B and 5C, three different methods are shown for routing the optical waveguide close to each optical ring resonator in a single row of a sensor array. Dotted lines 500, 501, 502, 503, 504 and 506 show the centerlines for each of the optical ring resonators 511-514 (FIG. 5A), 521-524 (FIG. 5B) and 531-534 (FIG. 5C). In FIG. 5A, waveguide 510 is aligned in a straight horizontal line, with the four optical ring resonators 511, 512, 513, 514 (and the associated diaphragms 200) having a centerline 504 offset from horizontal due to the changing diameters of optical ring resonators 511-514. In FIG. 5B, the centerline 505 for the four optical ring resonators 511, 512, 513, 514 (and the associated diaphragms 200) is horizontal, with waveguide 520 offset from horizontal due to the changing diameters of optical ring resonators 521-524. In FIG. 5C, centerline 506 for the four optical ring resonators 531, 532, 533, 534 (and the associated diaphragms 200) is horizontal, and waveguide 530 includes both straight and curved sections (the small redirections in waveguide 530 that all of the diaphragms stay along a horizontal centerline), with each of the straight sections directly adjacent to an associated one of the four optical ring resonators 531, 532, 533, 534. As one of ordinary skill in the art will readily recognize, the choice of how to route the optical waveguide depends on the layout of the optical ring resonators (in terms of diameter size) in the array.

Figure 6:
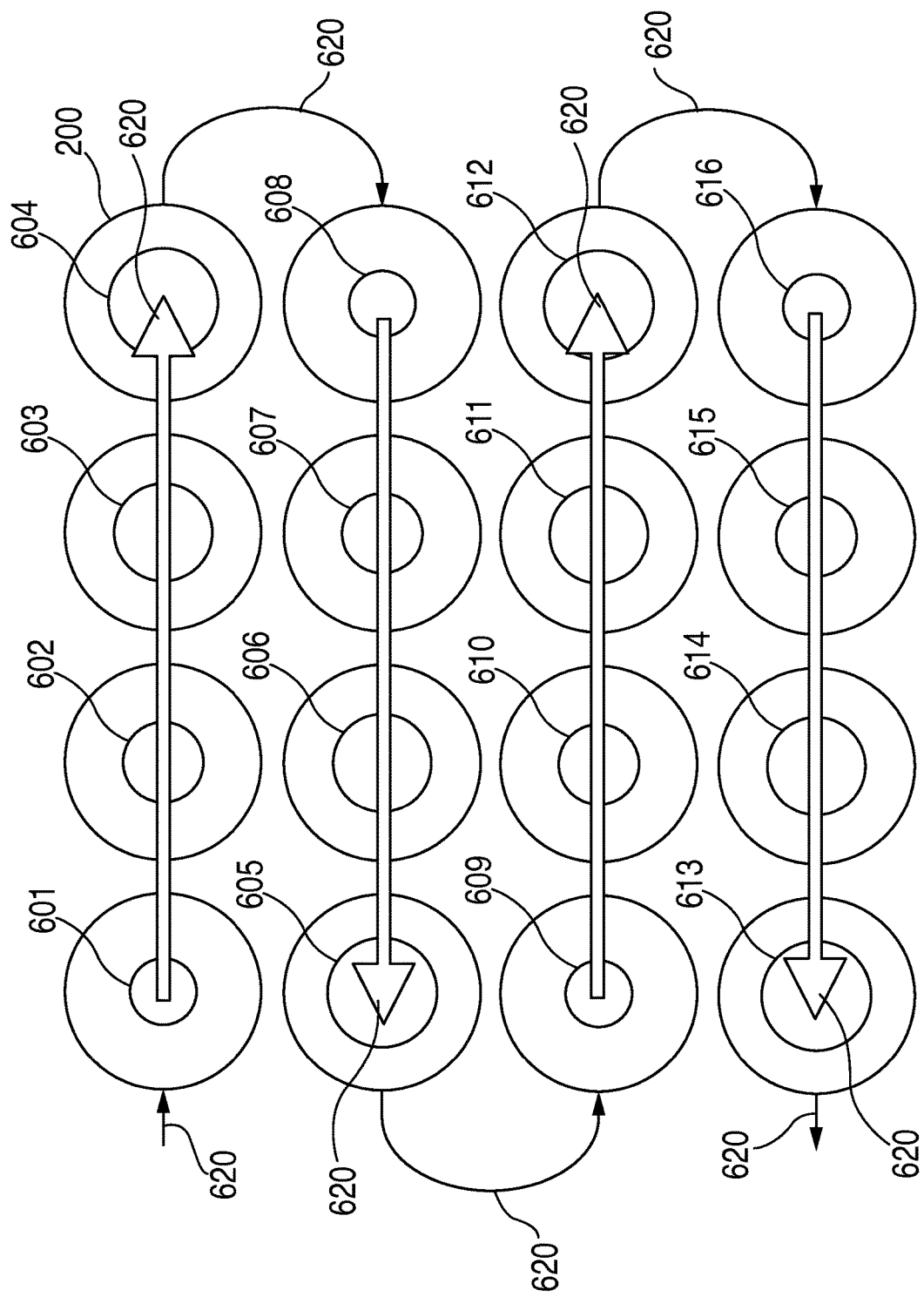
FIG. 6 is a block diagram showing a first embodiment of the silicon substrate for the sensor array of the present disclosure.

There are a number of different ways to vary the layout of the optical ring resonators (in terms of diameter size) in the array. For example, as shown in FIG. 6, a first embodiment is shown in which a sensor array includes sixteen optical ring resonators 601-616, each positioned over an associated diaphragm 200, arranged in a four-by-four matrix. In this first preferred embodiment, the diameter of each optical ring resonator increases in size along the path of the light in each row (shown generally by lines 620). Thus, in the top row, optical ring resonator 601 is the smallest, with each other optical ring resonator in that row (ref. nos. 602, 603, 604) have a progressively larger diameter. This pattern repeats (in the opposite direction) in each subsequent row, following the light path represented by lines 620. Thus, in the second row from the top, optical ring resonator 608 is smallest, with each other optical ring resonator in that row (ref. nos. 607, 606, 606) having a progressively larger diameter. Further, in the third row from the top, optical ring resonator 609 is smallest, with each other optical ring resonator in that row (ref nos. 610, 611, 612) having a progressively larger diameter. Finally, in the second row from the top, optical ring resonator 616 is smallest, with each other optical ring resonator in that row (ref nos. 615, 614, 613) having a progressively larger diameter.

Figure 7:
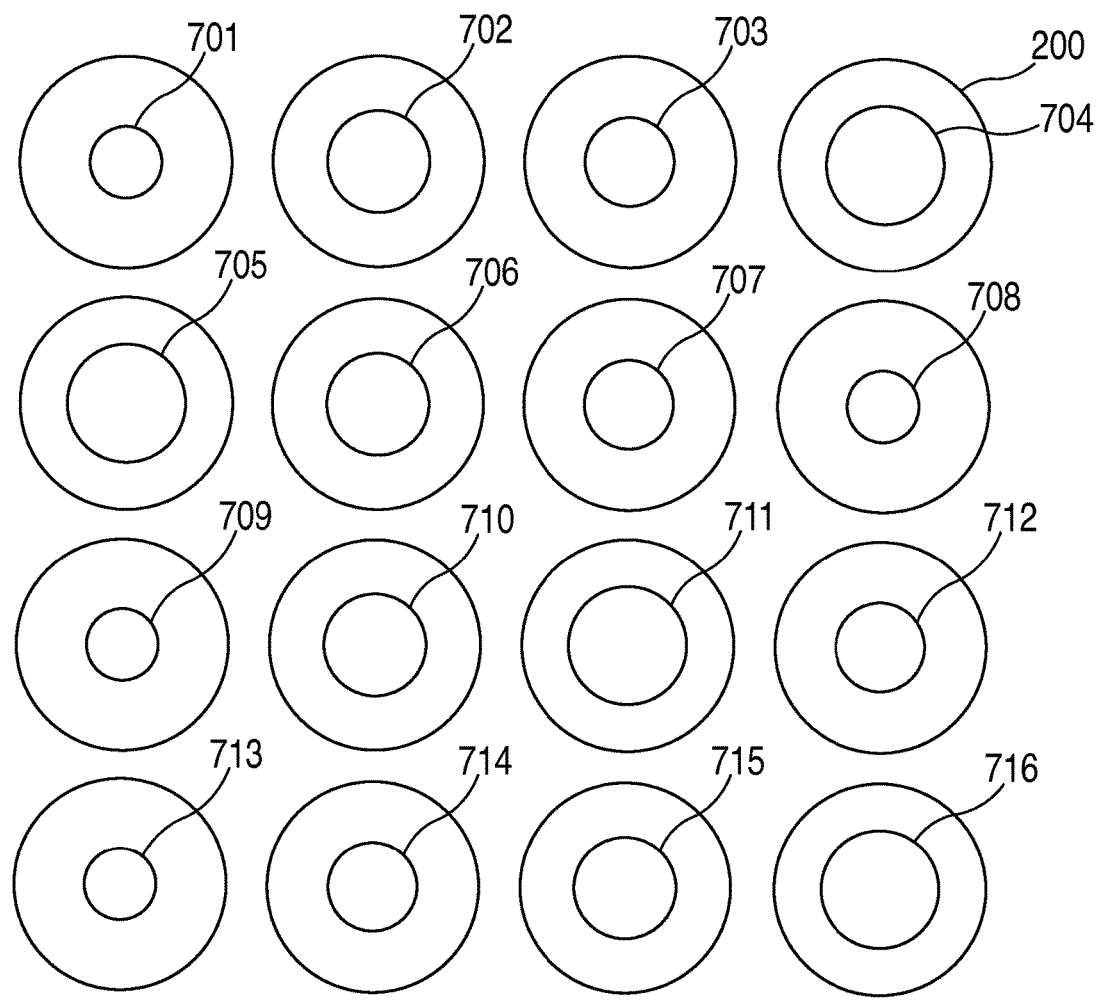
FIG. 7 is a block diagram showing a second embodiment of the silicon substrate for the sensor array of the present disclosure.
Figure 8:
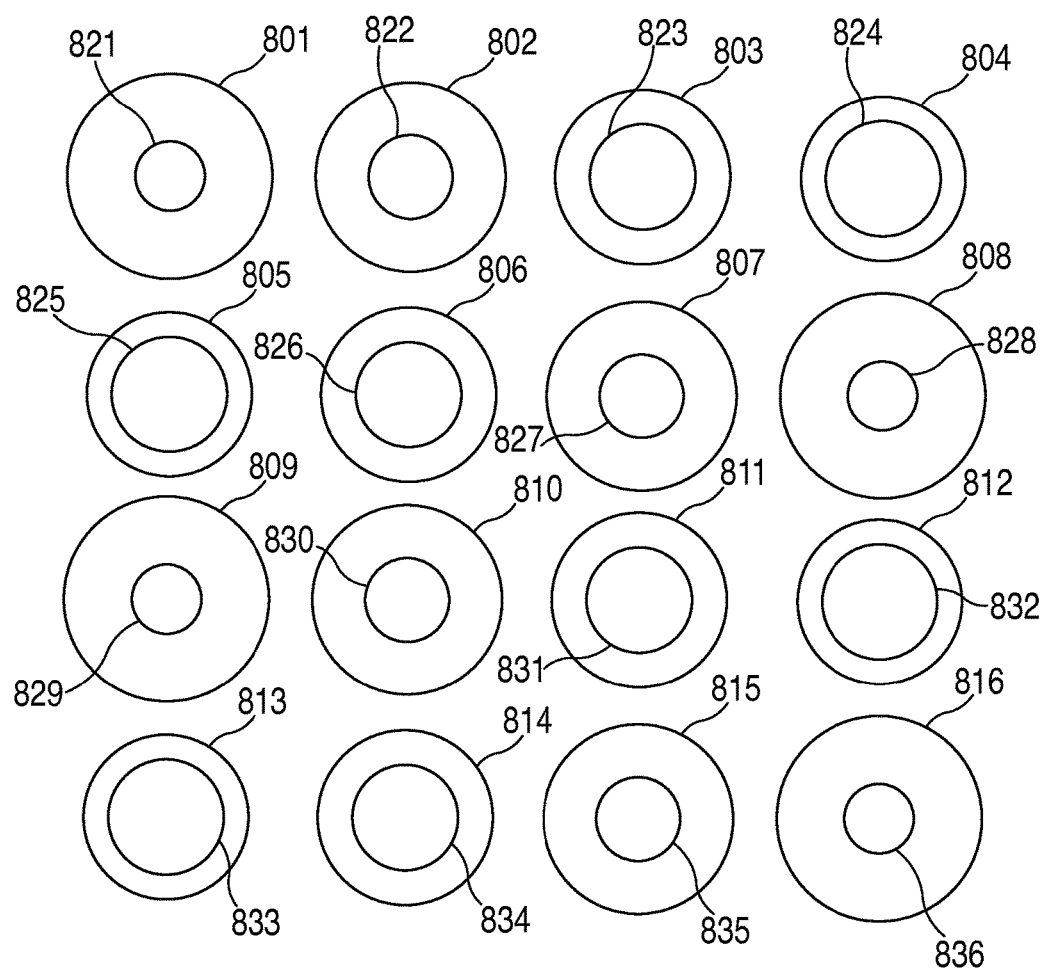
FIG. 8 is a block diagram showing a third embodiment of the silicon substrate for the sensor array of the present disclosure.

In a second embodiment of a sensor layout arrangement shown in FIG. 7, the diameter of each optical ring resonator 701-716 (each positioned over an associated diaphragm 200) is distributed randomly throughout the four-by-four matrix. Notably, in FIGS. 6 and 7, the same sized diaphragm 200 is used for each optical ring resonator sensor. In FIG. 8, a third embodiment of a sensor layout arrangement is shown which varies both the size of the optical ring resonators 821 to 836 and the size of the diaphragms 801 to 816. This arrangement allows the sensitivity of the sensor formed by each optical ring resonator/diaphragm pair to be equalized mechanically (as one of ordinary skill in the art will readily recognize, the sensitivity of the sensor formed by each optical ring resonator/diaphragm pair in FIGS. 6 and 7 may be equalized in software).

Figure 9A:
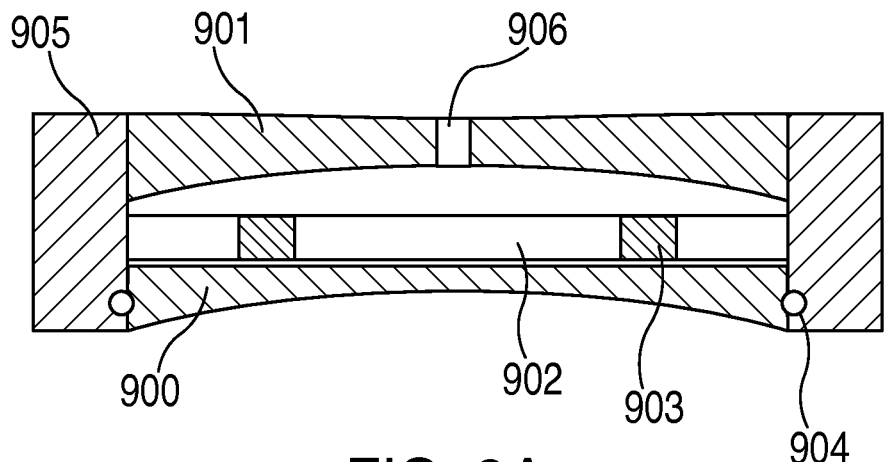
FIG. 9A is a diagram showing a single ring resonator/diaphragm including an overstrain stop (without pressure applied) for use in the sensor array of the present disclosure.
Figure 9B:
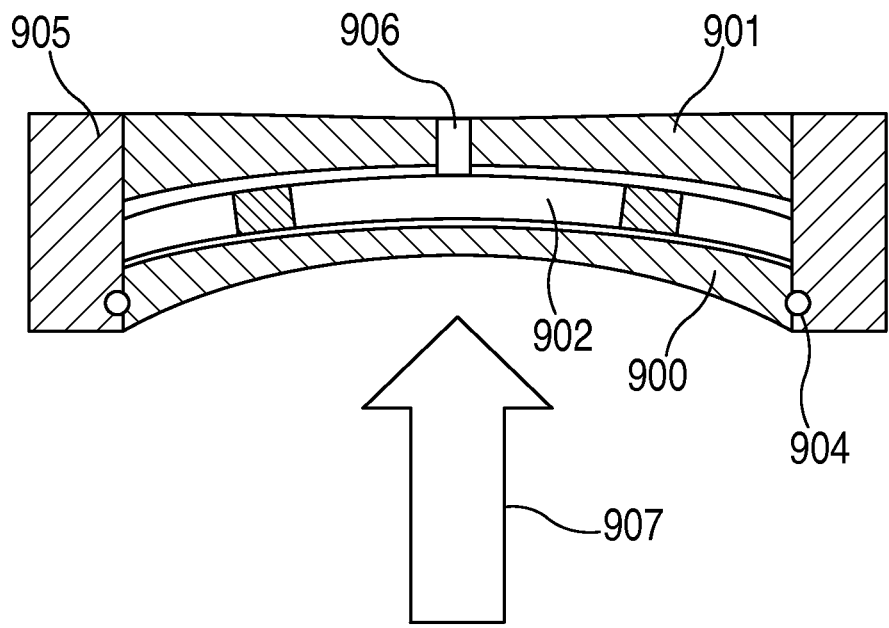
FIG. 9B is a diagram showing a single ring resonator/diaphragm including an overstrain stop (with pressure applied) for use in the sensor array of the present disclosure.

The optical ring resonator sensor array modules of the present disclosure are typically designed to measure a particular range of acoustic pressure, and could be damaged if excessive acoustic pressure is received. To prevent such damage, in a further embodiment of the present disclosure, a pressure-limiting stop is included to prevent any damage from excessive acoustic pressure signal waves. Referring to FIG. 9A, a single diaphragm 900 is shown in cross-section adjacent to a substrate 902 (which includes an optical ring resonator 903 and an optical waveguide that is not shown in FIG. 9A), with diaphragm 900 secured in a supporting structure 905 via an o-ring 904. As one of ordinary skill in the art will readily recognize, other structures can be used to secure diaphragm 900 into supporting structure 902, and in some cases diaphragm 900 and supporting structure 905 can be formed together as a common structure. A mechanically-limiting structure 901 (preferably having a vent hole 906) is provided as a hard stop to prevent any damage to substrate 902 in response to excessive pressure signals. As shown in FIG. 9B, after a certain level of pressure is reached (applied pressure is shown by arrow 907), the mechanically-limiting structure 901 prevents any further flexing of substrate 902.

As one of ordinary skill in the art will readily recognize, the optical ring resonator sensor array modules of the present disclosure must be pressure-sealed to prevent damage to the internal components. When separate diaphragms (e.g., diaphragm 900) are inserted into a supporting structure 905 for each sensor (as shown in FIG. 9A), o-rings 904 (preferably piston o-rings) may be used on the diaphragm assembly itself. In the alternative, gaskets and face seals may be used in this configuration. Specialized seals will not be necessary when each diaphragm is formed as part of the supporting structure, however.

Figure 10B:
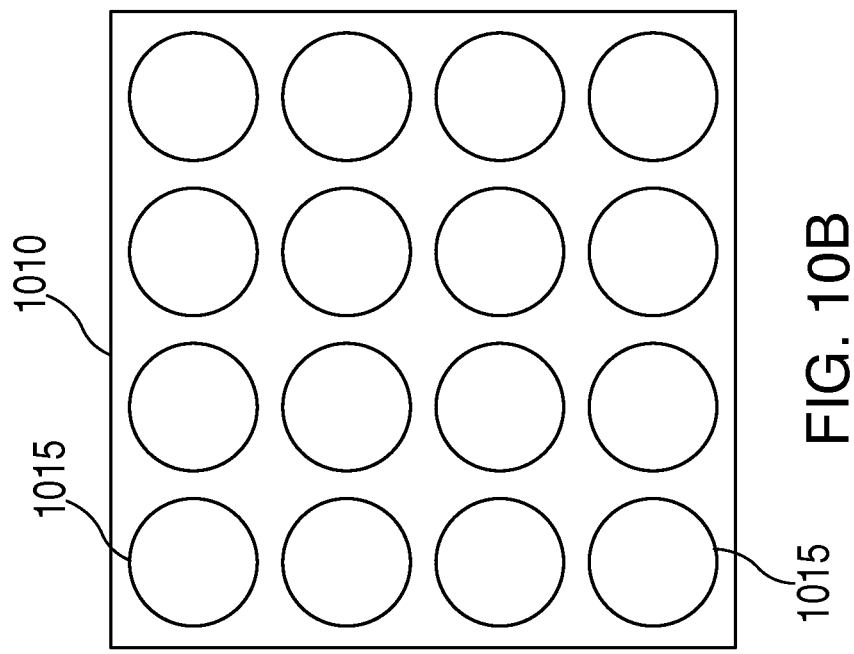
Figure 10A:
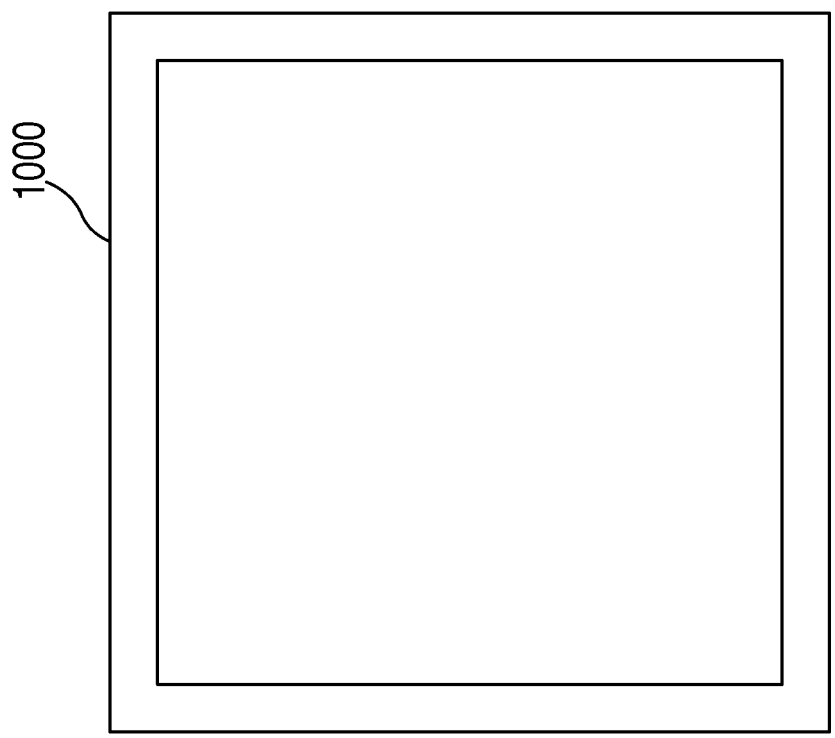
Figure 10C:
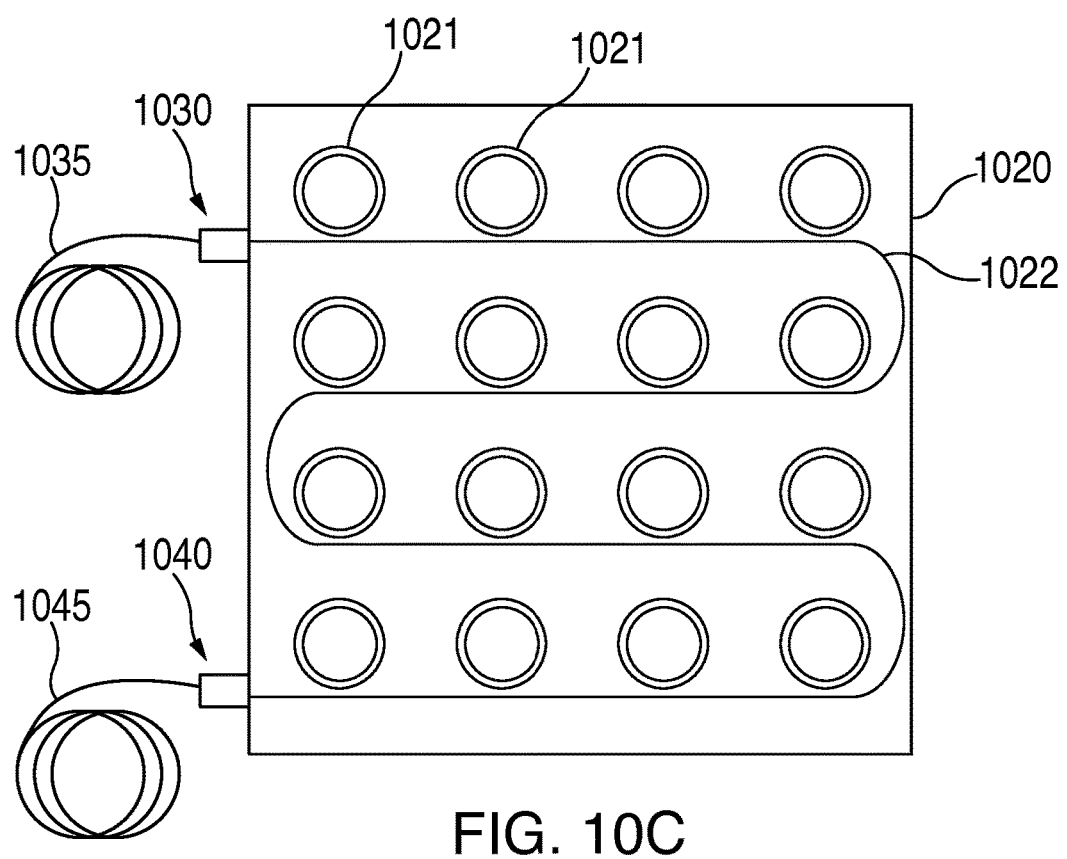
Figure 10D:
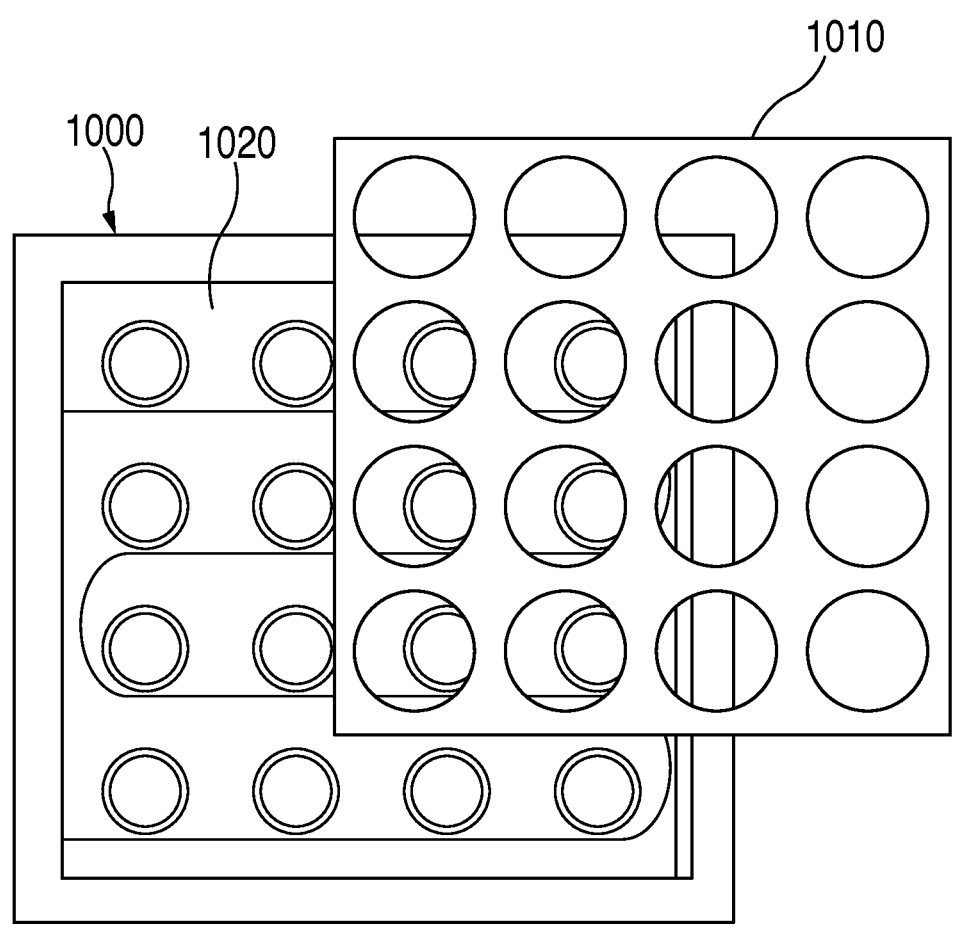

The assembly process for a single optical ring resonator sensor array module according to an embodiment of the present disclosure is shown in FIGS. 10A-10F. First, FIG. 10A shows an outer casing 1000 for supporting a silicon substrate 1020 (FIG. 10C) which includes all of the optical ring resonators 1021 and the optical waveguide 1022. FIG. 10A shows a top plate 1010 having a plurality of cutouts (holes) 1015, each for receiving a diaphragm (as shown in FIG. 10E). FIG. 10C shows silicon substrate 1020 including a plurality of optical ring resonators 1021 formed in a four-by-four array and an optical waveguide 1022. As one of ordinary skill in the art will readily recognize, the size of the array is a design choice and the array can be either bigger or smaller, depending on the design constraints discussed above. Also shown in FIG. 10C are two fiber-to-waveguide optical couplers 1030, 1040 and two optical fibers 1035, 1045. A light signal from a source (not shown) directed into a first optical fiber 1035 is coupled into the optical waveguide 1022 via optical coupler 1030. In some further embodiments, additional waveguides and coupler pairs may be required to support all of the optical ring resonators. In other further embodiments, waveguides from several substrates may be coupled together to form a single light path, reducing the number of couplers required. Thereafter, the light signal from optical waveguide 1022 is coupled to a second optical fiber 1040 via optical coupler 1045 and then to a detector (also not shown). The pathway of light though waveguide 1022 is discussed below in more detail with respect to FIG. 12. FIG. 10D shows the substrate 1020 mounted onto outer casing 1000, with top plate 1010 positioned over the substrate 1020 and outer casing 1000. FIG. 10E shows top plate 1010 mounted to the outer casing 1000, with the substrate 1020 sandwiched between the outer casing 1000 and the top plate 1010. As one of ordinary skill in the art will readily recognize, an appropriate seal may be required between outer casing 1000 and top plate 1010. A single diaphragm 1050 is shown with an arrow 1055 pointing to cutout 1015 where the diaphragm is to be installed. Diaphragms 1050 are to be installed in each of the cutouts 1015. Finally, FIG. 10F shows a completed optical ring resonator sensor array module 1060 with diaphragms 1050 mounted in each cutout 1015 of top plate 1010. As discussed above, each diaphragm 1050 may be secured with an o-ring or an equivalent mounting technique. In the alternative, as also discussed above, each of the diaphragms 1050 may be formed as part of and thus be integral to top plate 1010. Although not shown in FIGS. 10A to 10F, top plate 1010 and/or outer casing 1000 also requires cutouts and seals for the optical couplers 1030, 1040 shown in FIG. 10C.

Figure 11:
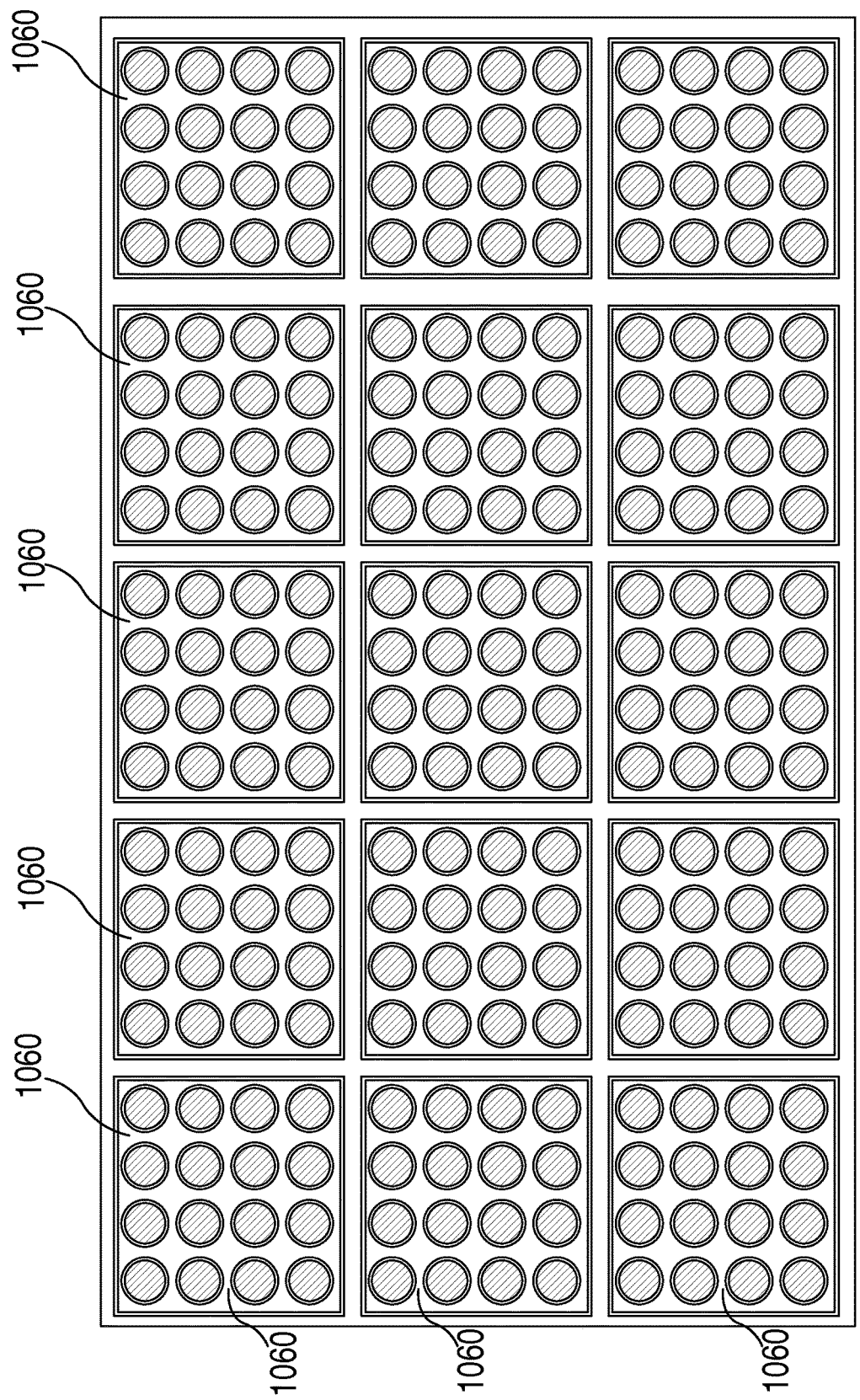
FIG. 11 is a block diagram of a complete sensor array according to the present disclosure.

Referring now to FIG. 11, completed optical ring resonator sensor array modules 1060 may be coupled together to form a larger assembly 1100. In some embodiments, depending on the design constraints discussed above, the modules 1060 may be configured to serially pass a single light signal, and necessitating only a single set of input and output fibers for assembly 1100. In other embodiments, subsets of modules 1060 may be linked to serially pass a single light signal, necessitating a set of input and output fibers for each such submodule in assembly 1100. Although the assembly 1100 is shown in two-dimensional form in FIG. 11, in other embodiments each of the optical ring resonator sensor array modules 1060 may be aligned in different planes, providing a three-dimensional sensor assembly.

Referring now to FIG. 12, a complete sensor system 1200 is shown for use with the optical ring resonator sensor arrays of the present disclosure. In particular, an appropriate light source 1205 provides a light signal onto an optical fiber 1210 that is then coupled (via a coupler not shown, for example) to an optical waveguide that is part of one or more sensor arrays 1215 (each of the sensor arrays corresponding to an optical ring resonator sensor array modules 1060 as shown in FIG. 10F, for example). Each of the sensors within the one or more sensor arrays 1215 acts as a notch filter, as discussed with respect to FIGS. 1 to 3 above, each having a slightly different center frequency, and the light signal passing through the one or more sensor arrays will effectively be filtered at the center frequency of each of the sensors. Thereafter, the light signal exits the one or more sensor arrays 1215 to optical fiber 1220 (via a coupler not shown, for example) and then passes to an optical detector 1225 which converts the received optical signal into an electrical signal. The electrical signal output from optical detector 1225 is coupled to a processor 1235 via a link 1230. Processor 1235 is preconfigured to identify the center frequencies of each of the sensors in the one or more sensor arrays 1215 when no pressure is applied, and is also preconfigured to identify the sensitivity of each sensor. As discussed above, each sensor within the one or more sensor arrays 1215 may be designed to have equal sensitivity or may have a different sensitivity (requiring that the sensitivity of each sensor be separately predetermined). During operation, processor 1235 detects acoustical pressure signals for each of the sensors within the one or more sensor arrays 1215 based upon the shift of the associated center frequency (with the amount of acoustical pressure based on the associated sensitivity).

The optical ring resonator sensor array modules of the present disclosure may be formed into many different size arrays, allowing such arrays to be tuned to particular types of acoustic waves. In operation, a sonar system consisting of optical ring resonator sensor array modules of the present disclosure may include many arrays of the same configuration (array size and layout) or have one or more different configurations (allowing different modules for different depths, for example).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. An optical ring resonator sensor array module for a passive SONAR system, comprising:
   a supporting structure;
   a silicon substrate mounted on the supporting structure, the silicon substrate including an optical waveguide and a plurality of optical ring resonators, the plurality of optical ring resonators distributed across the silicon substrate to form a two-dimensional array pattern thereof, the two-dimensional array forming at least two rows and at least two columns, with at least two optical ring resonators in each row and at least two optical ring resonators in each column, each of the plurality of optical ring resonators positioned adjacent to the optical waveguide, each of the plurality of optical ring resonators having a different predetermined diameter, the optical waveguide having an input for receiving light at a first end thereof and an output for emitting light at a second end thereof; and
   a top plate mounted over the silicon substrate, the top plate having a plurality of diaphragms, one diaphragm for each of the plurality of optical ring resonators, the diaphragms distributed on the top plate such that each of the plurality of diaphragms is positioned over an associated one of the plurality of optical ring resonators, each of the diaphragms configured to flex in response to externally applied acoustical pressure.

2. The optical ring resonator sensor array of claim 1, wherein the supporting structure includes a mechanical stop for each of plurality of optical ring resonators, the mechanical stop configured to prevent overstress of the silicon substrate in response to the externally applied acoustical pressure.

3. The optical ring resonator sensor array of claim 1, wherein each of the plurality of diaphragms is mounted in an associated aperture of the top plate.

4. The optical ring resonator sensor array of claim 3, wherein each of the plurality of diaphragms is secured in the associated aperture of the top plate by an o-ring seal.

5. The optical ring resonator sensor array of claim 1, wherein each of the plurality of diaphragms is mounted in an integral part of the top plate.

6. The optical ring resonator sensor array of claim 1, wherein each of the plurality of diaphragms has the same diameter, the same thickness, and the same flexibility.

7. The optical ring resonator sensor array of claim 1, wherein each of the associated ones of the plurality of optical ring resonators and of the plurality of diaphragms form a separate sensor having an associated sensitivity, wherein each of the plurality of diaphragms has the same diameter and the same flexibility, and wherein the thickness of each of the diaphragms is varied to equalize the sensitivity of each of the separate sensors.

8. The optical ring resonator sensor array of claim 1, wherein each of the associated ones of the plurality of optical ring resonators and of the plurality of diaphragms form a separate sensor having an associated sensitivity, and wherein each of the plurality of diaphragms has the same flexibility and the same thickness, and wherein the diameter of each of the diaphragms is varied to equalize the sensitivity of each of the separate sensors.

9. The optical ring resonator sensor array of claim 1, wherein each of the associated ones of the plurality of optical ring resonators and of the plurality of diaphragms form a separate sensor having an associated sensitivity, and wherein each of the plurality of diaphragms has the same diameter and the same thickness, and wherein the flexibility of each of the diaphragms is varied to equalize the sensitivity of each of the separate sensors.

10. A passive SONAR system, comprising:
    an optical source for providing a light beam;
    a first fiber optic cable having a first end and a second end, the first end of the first optical cable coupled to receive the light beam from the optical source;
    an optical ring resonator sensor array module comprising:
      a supporting structure;
      a silicon substrate mounted on the supporting structure, the silicon substrate including an optical waveguide and a plurality of optical ring resonators, the plurality of optical ring resonators distributed across the silicon substrate to form a two-dimensional array pattern thereof, the two-dimensional array forming at least two rows and at least two columns, with at least two optical ring resonators in each row and at least two optical ring resonators in each column, each of the plurality of optical ring resonators positioned adjacent to the optical waveguide, each of the plurality of optical ring resonators having a different predetermined diameter, the optical waveguide having an input coupled to the second end of the first optic cable and an output for emitting light at a second end thereof; and
      a top plate mounted over the silicon substrate, the top plate having a plurality of diaphragms, one diaphragm for each of the plurality of optical ring resonators, the diaphragms distributed on the top plate such that each of the plurality of diaphragms is positioned over an associated one of the plurality of optical ring resonators, each of the diaphragms configured to flex in response to externally applied acoustical pressure, each of the associated ones of the plurality of optical ring resonators and of the plurality of diaphragms forming a separate acoustical pressure sensor;

a second fiber optic cable having a first end and a second end, the first end of the second optical cable coupled to the output of the optical waveguide on the silicon substrate;

an optical detector coupled to the second end of the second fiber optic cable, the optical detector configured to convert any received light signal from the second fiber optic cable to an associated electrical signal; and a processor coupled to receive the electrical signal from the optical detector, the processor configured to process the received electrical signal to calculate a measurement signal for each of the separate acoustical pressure sensors based on a change in a center frequency of a notch filter formed by the optical ring resonator associated with each separate acoustical pressure sensor.

11. The passive SONAR system of claim 10, wherein the supporting structure includes a mechanical stop for each of plurality of optical ring resonators, the mechanical stop configured to prevent overstress of the silicon substrate in response to the externally applied acoustical pressure.

12. The passive SONAR system of claim 10, wherein each of the plurality of diaphragms is mounted in an associated aperture of the top plate.

13. The passive SONAR system of claim 12, wherein each of the plurality of diaphragms is secured in the associated aperture of the top plate by an o-ring seal.

14. The passive SONAR system of claim 10, wherein each of the plurality of diaphragms is mounted in an integral part of the top plate.

15. The passive SONAR system of claim 10, wherein each of the plurality of diaphragms has the same diameter, the same thickness, and the same flexibility.

16. The passive SONAR system of claim 10, wherein each of the associated ones of the plurality of optical ring resonators and of the plurality of diaphragms form a separate sensor having an associated sensitivity, wherein each of the plurality of diaphragms has the same diameter and the same flexibility, and wherein the thickness of each of the diaphragms is varied to equalize the sensitivity of each of the separate sensors.

17. The passive SONAR system of claim 10, wherein each of the associated ones of the plurality of optical ring resonators and of the plurality of diaphragms for a separate sensor having an associated sensitivity, and wherein each of the plurality of diaphragms has the same flexibility and the same thickness, and wherein the diameter of each of the diaphragms is varied to equalize the sensitivity of each of the separate sensors.

18. The passive SONAR system of claim 10, wherein each of the associated ones of the plurality of optical ring resonators and of the plurality of diaphragms for a separate sensor having an associated sensitivity, and wherein each of the plurality of diaphragms has the same diameter and the same thickness, and wherein the flexibility of each of the diaphragms is varied to equalize the sensitivity of each of the separate sensors.

19. A method for providing a passive SONAR system, comprising the steps of:

providing a light signal to an input of an optical ring resonator sensor array module, the module including a silicon substrate mounted on a supporting structure, the silicon substrate including an optical waveguide and a plurality of optical ring resonators, the plurality of optical ring resonators distributed across the silicon substrate to form a two-dimensional array pattern thereof, the two-dimensional array forming at least two rows and at least two columns, with at least two optical ring resonators in each row and at least two optical ring resonators in each column, each of the plurality of optical ring resonators positioned adjacent to the optical waveguide, each of the plurality of optical ring resonators having a different predetermined diameter, the optical waveguide having an input coupled to the input of the module and an output for emitting light at a second end thereof coupled to an output of the module, the module also including a top plate mounted over the silicon substrate, the top plate having a plurality of diaphragms, one diaphragm for each of the plurality of optical ring resonators, the diaphragms distributed on the top plate such that each of the plurality of diaphragms is positioned over an associated one of the plurality of optical ring resonators, each of the diaphragms configured to flex in response to externally applied acoustical pressure, each of the associated ones of the plurality of optical ring resonators and of the plurality of diaphragms forming a separate acoustical pressure sensor;

converting the light signal received from the output of the module to an associated electrical signal; and processing the associated electrical signal to calculate a measurement signal for each of the separate acoustical pressure sensors based on a change in a center frequency of a notch filter formed by the optical ring resonator associated with each separate acoustical pressure sensor.

20. The method of claim 19, further comprising the step of equalizing the measurement signals for the separate acoustical pressure sensors based on predetermined information.

* * * * *